INVENTORS:
T. M. DOSCHER
J. G. YARBROUGH
BY: J. H. McCarthy
THEIR AGENT

Sept. 20, 1960  T. M. DOSCHER ET AL  2,953,204
FILTERING METHOD AND APPARATUS FOR WATER FLOODING PROCESS
Filed July 23, 1957  3 Sheets-Sheet 2

INVENTORS:
T. M. DOSCHER
J. G. YARBROUGH
BY: J. H. McCarthy
THEIR AGENT

INVENTORS:
T. M. DOSCHER
J. G. YARBROUGH
BY: J. H. McCarthy
THEIR AGENT

_United States Patent Office_

2,953,204
Patented Sept. 20, 1960

2,953,204

FILTERING METHOD AND APPARATUS FOR WATER FLOODING PROCESS

Todd M. Doscher, Bellaire, and Jack G. Yarbrough, Houston, Tex., assignors to Shell Oil Company, New York, N.Y., a corporation of Delaware Filed July 23, 1957, Ser. No. 673,627

6 Claims. (Cl. 166—9)

This invention relates to an oil-producing method, commonly known as secondary recovery, in which the oil recovery is aided by the injection of a fluid into the oil-bearing formation. When water is used the method is called water flooding. More particularly, the invention pertains to an economical method of freeing liquids, which are injected into subsurface formations, from suspended solids that plug the pores of the formation.

Crude oils are relatively viscous materials, and the pores of oil-containing subsurface formations, such as sandstones or limestones, are often relatively small. Where the only driving force tending to move the oil toward the well is the pressure differential that can be created by a pumping means in the bottom of a well, large amounts of oil contained in subsurface reservoirs are often unrecovered. Numerous methods have been developed for injecting gaseous or liquid fluids through one or more input wells to increase the fluid pressure tending to drive the oil toward an output well. If the injected fluid is totally gaseous, it may "channel" the reservoir and by-pass portions of the oil, or flow into and interfere with other wells in the vicinity. For this reason, gas injections are usually supplemented by the injection of liquids such as liquified hydrocarbons and/or water. The ideal case of a discrete body of injected liquid driving the oil as a discrete body, is seldom, if ever, realized. Instead a liquid "break through" usually occurs, and the fluid produced from the output well usually consists of a large proportion of the injected fluid mixed with a small proportion of oil.

Due to the large amounts of injection fluid used compared to the oil produced, the combined fluids produced from the output wells are usually separated so that the oil can be recovered and stored, while the injected fluid is recycled by reinjecting it through the input wells. The economics of a fluid drive process always entail a close balance between the cost of producing the oil and the value of the oil produced. The liquids which are injected are usually the cheapest available, such as a subsurface formation water or water from rivers and lakes in the vicinity of the wells.

Flowing liquids tend to entrain and carry along small solid particles, such as compounds which precipitate from the water due to changes in acidity, pressure and temperature. Saline waters and other naturally occurring liquids often contain bacteria or minerals which are conducive to the corrosion of pipes and the entrainment of solid particles. In some cases, even where the corrosive tendencies due to the mineral content can economically be controlled as far as metal loss is concerned, a degree of "low level" corrosion occurs, which, due to the length of distributing lines and injection tubing, results in a significant amount. The liquids injected in a fluid drive process are, of course, usually subjected to filtration at the surface of the well, to remove entrained solids having a diameter of more than about 3 to 5 microns. The surface filtration frees the liquids of particles likely to be trapped in the pores of the formation, before the liquids are injected into the well. But, the formations into which the liquids are injected often lie many hundreds or thousands of feet below the earth's surface, and the liquids injected into the well must be conveyed to those formations through pipes which are also subject to corrosion.

A primary object of the present invention is to provide an economically feasible method for keeping liquids, which are injected into subsurface formations, free of solid particles likely to plug the pores of the formation, without the necessity of controlling the composition of the liquids so that the liquids will not cause the formation of minute particles.

A further object of the present invention is to provide apparatus for filtering injected fluids at the bottom of a well, said apparatus having filter elements that may be readily removed and replaced.

These and other objects will be understood from the following description taken with reference to the drawing, wherein.

Basically, the present invention is directed to the downhole filtration of liquids which are injected into subsurface formations after normal filtration of the injection fluids has been carried out by a conventional filtration system of the surface. Downhole filtration frees the injected liquids of any solids entrained in their passage through pipes. Without downhole filtration, such solids would be lodged in the interstices of the formation before the liquids could pass into and through the formations, out through the production well, and into a filter located at the surface.

Figure 1:
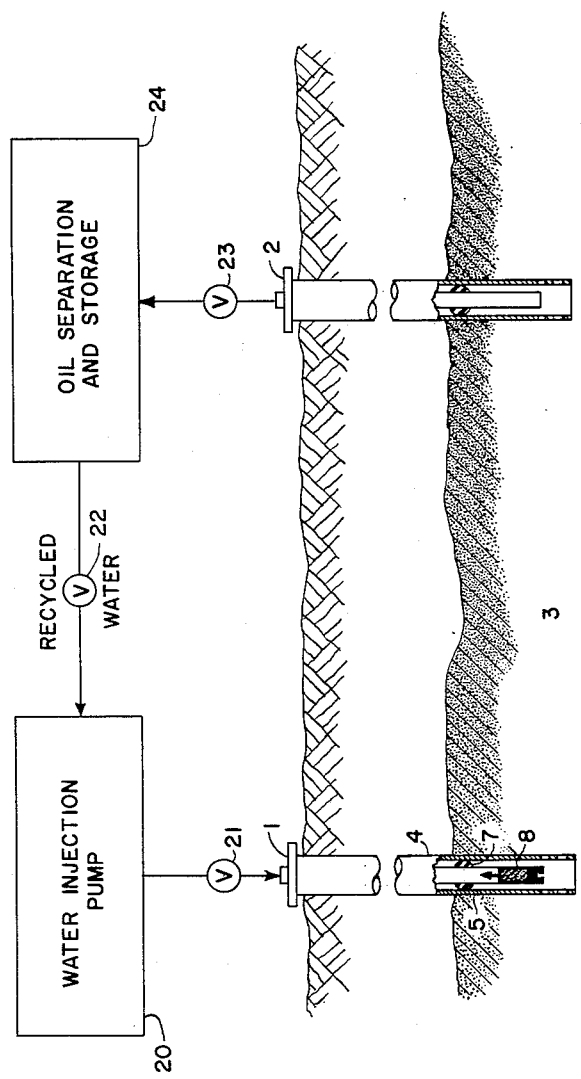
Figure 1 is a schematic view of an oil field, taken in cross section, illustrating an input and output well.

Figure 1 illustrates a preferred method of practicing the invention. An input well 1 and a production well 2 are drilled into a subsurface oil formation 3. The input well equipment includes a casing 4, the upper portion of which is sealed to the formation, and the lower portion of which is opened for the passage of fluids into the formation. An injection tubing string including injection pipe 5 is hung within the casing 4 in the conventional manner.

The injection pipe 5 provides a fluid conduit extending from the vicinity of the earth's surface to the vicinity of the subsurface formation 3 to be flooded. As is shown in greater detail in Figure 2, the bottom end of the injection pipe 5 is provided with a perforated cap or shoe 6, which forms an inward projection or shoulder 6a extending into the interior of the injection pipe.

The injection pipe 5 is also provided with means for supplying liquids to the pipe under pressures exceeding the fluid pressures within the subsurface formation. These means can comprise any of the conventional pump 20 and valve 21, 22 arrangements for injecting liquids and/or gases into subsurface formations. The production tubing in the production well is equipped with a conventional arrangement of valves 23, separators, storage tanks 24; and if desired, with equipment for returning part or all of the injected liquids that are produced along with the oil, to the injection pumping means, for recycling through the subsurface formation.

As shown in Figure 1, a conventional packer 7 placed near the lower end of injection pipe 5 confines the liquids which flow out of the pipe and forces them to enter the subsurface formation. The means for confining the liquids can comprise a head of pressure maintained on the gaseous or liquid fluids in the annular space between pipes 4 and 5, or any of the conventional arrangements for insuring that the injected liquids enter the selected subsurface formation.

The liquids injected through pipe 5 into the subsurface formation are filtered through a renewable filter positioned as indicated at 8 in Figure 1. The filtering means comprises a filter bed 9 (Figure 2) mounted on a frame consisting of a perforated pipe 10, which is detachably connected between the top piece 11 and the bottom piece 12. The filter bed 9 and the frame 10, 11 and 12 are arranged to form a renewable filtering means which is adapted to pass through the injection pipe 5 and stop when the frame contacts the inward projection or shoulder 6a. The bottom piece 12 of the filter frame is shaped to rest snugly against the inward projection 6a and is provided with O-ring 13. The O-ring and the inward projection 6a cooperate to form a disengageable fluid confining or sealing means which is arranged to cause substantially all the liquids that flow through the injection pipe 5 to flow through the filter bed when the filter is in place. The upper portion of top piece 11 of the filter frame is shaped so that it provides a latch means or fishing head adapted to receive and engage a cooperating latch means or fishing tool (not shown) attached to and lowered by a wireline. This forms a connection by which the filter means can be readily withdrawn from its position at the bottom of the injection pipe.

Figure 2:
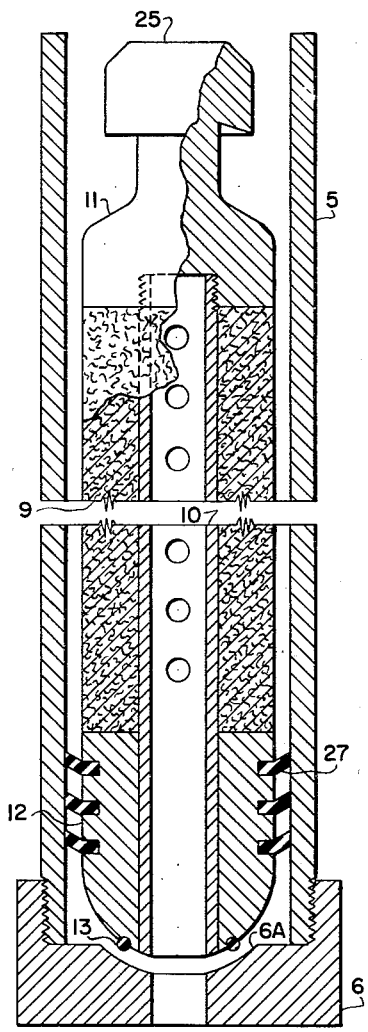
Figures 2 and 3 are views taken in vertical cross section of filter apparatus employed with the method of the present invention.

In employing the apparatus illustrated in Figure 2, the injection tubing 5 string is provided with the perforated cap 6 before the tubing string is run into the well. The filter means 8 or 9 to 12 is placed in the vicinity of the subsurface formation and at the bottom of the string 5 by allowing it to fall through the injection string 5. The injection liquids, such as the flood water for a water-drive operation, flows around the upper piece 11 of the filter frame, through the filter bed 9 into the perforated pipe 10, and out of the injection tubing through the opening in perforated cap 6. The weight of the filter means plus the pressure drop across the filter, presses the O-ring 13 firmly against the projection 6a, to form a seal forcing substantially all of the liquid to flow through the filter bed. Alternatively the O-ring seal 13 may be mounted on the inner face of projection 6a.

If desired, the O-rings 13 which form sealing means at the bottom of the filter means may be replaced by flexible swab cups 27 carried below the filter material 9. A filter with swab cups 27 would have to be circulated down through the injection string 5, but on withdrawal therefrom the swab cups 27 would remove any particles from the inner wall of string 5.

The preferred form of the filter means is adapted to employ as filter bed elements 9, cotton or nylon filter cartridges which are commonly available with pore openings of 0.1 microns, openings of 1 to 3 microns, etc. A wide variety of different arrangements with different filter bed elements can be employed in the construction of the filter means. The cotton or nylon filter cartridges are particularly desirable because of their availability and low cost.

Figure 3:
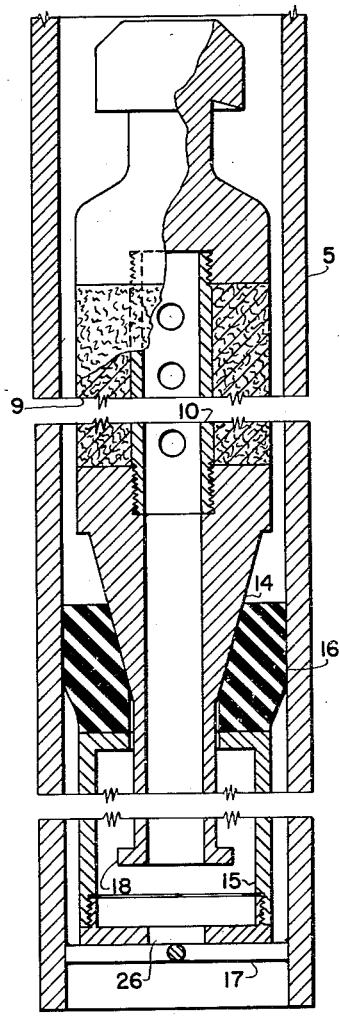

Figure 3 shows a packer arrangement adapted to be employed on renewable filters adapted for use in the ends of injection tubing strings that have previously been set in input wells with a small cross-screen, tubing stop, or other inward projection partly closing the tubing at or near the end.

When necessary, any projection of this type may be installed in the lower end of a casing or tubing string by conventional wire-line equipment in any suitable manner well known to the art.

In the arrangement of Figure 3, the perforated pipe 10 that is surrounded by the filter bed element 9, is connected to a hollow, cone-shaped bottom piece 14. The lower portion of cone 14 terminates in an outwardly extending flange 18, and is arranged to slide freely within sleeve 15 which also has an opening 26 at the bottom. The central portion of the cone is surrounded by a packer ring 16 composed of a resilient material. The packer ring 16 is arranged to pass freely through pipe 5 when the cone is in its uppermost position within the sleeve 15, and to be pressed tightly against the walls of pipe 5 when the cone is in its lowermost position within the sleeve.

When this filter means falls through pipe 5 until the sleeve 15 contacts an inward extension, such as cross 17, gravity and the inertia of the filter means jam the cone 17 into the packer ring, to form the disengageable, fluid-confining seal that causes liquids flowing through the pipe 5 to flow through the filter bed 9.

We claim as our invention:

1. A method of recovering oil from an underground formation having in communication therewith at least one injection well and one production well, said method comprising the steps of injecting a fluid under pressure into an injection well through a tubing string depending within said well, filtering any particles of matter from said injection fluid including particles picked up by passage of the fluid through said tubing string, said filtering taking place substantially at but prior to the point of discharge from said tubing string, and maintaining pressure on said injection fluid to force it through an oil-bearing formation in said injection well to said production well.

2. A method of recovering oil from an underground formation having in communication therewith at least one injection well and one production well, said method comprising the steps of injecting a fluid under pressure into an injection well through a tubing string depending within said well, filtering any particles of matter from said injection fluid including particles picked up by passage of the fluid through said tubing string, said filtering taking place substantially at but prior to the point of discharge from said tubing string, maintaining pressure on said injection fluid to force it through an oil-bearing formation in said injection well to said production well, removing the production fluid from said production well, separating the injection fluid from said production fluid, filtering the injection fluid and re-cycling the injection fluid down the tubing string again.

3. A method of recovering oil from an underground formation having in communication therewith at least one injection well and one production well, said method comprising the steps of injecting a fluid under pressure into an injection well through a tubing string depending within said well, creating a filtration zone at but upstream of the discharge point of said tubing string and at a level adjacent the formation into which the fluid is to be injected, filtering any particles of matter from said injection fluid including particles picked up by passage of the fluid through said tubing string, said filtering taking place at substantially the point of discharge from said tubing string, maintaining pressure on said injection fluid to force it through an oil-bearing formation in said injecton well to said production well.

4. Apparatus for injecting fluid through a well borehole into a subsurface formation comprising injection pump means located on the earth's surface near the top of the injection well, injection conduit means connected to the discharge of said pump means and extending into said well to at least substantially the level of the subsurface formation into which fluid is to be injected, perforate stop means carried within said conduit means near the discharge point thereof, elongated filter means having a diameter less than the inner diameter of said conuduit means whereby fluid passage means are formed between said filter means and said conduit means, said filter means being adapted to pass through said conduit means and rest against said stop means, and sealing means positioned in the fluid passage means between said conduit means and the lower end of the said filter means to prevent substantially the passage of fluid thereby, said filter means including conduit means in communication between the interior of said filter means and the discharge point of said injection conduit means downstream of said sealing means.

5. Apparatus for injecting filtered fluid through a well borehole into a subsurface formation comprising injection pump means located on the earth's surface near the top of the injection well, injection conduit means connected to the discharge of said pump means and extending into said well to at least substantially the level of the subsurface formation into which fluid is to be injected, perforate stop means carried within said conduit means near the discharge point thereof, removable elongated filter means having a diameter less than the inner diameter of said conduit means whereby fluid passage means are formed between said filter means and said conduit means, said filter means being adapted to pass freely through said conduit means and rest against said stop means, fishing head means mounted on the top of said filter means for withdrawing it from said conduit means, and sealing means carried on said filter means and positioned in the fluid passage means between said conduit means and the lower end of said filter means to prevent substantially the passage of fluid thereby, said filter means including conduit means in communication between the interior of said filter means and the discharge point of said injection conduit means downstream of said sealing means.

6. Apparatus for injecting filtered fluid through a well borehole into a subsurface formation comprising a well casing positioned in said well and perforated at a level adjacent the formation into which fluid is to be injected, injection pump means located on the earth's surface near the top of the injection well, injection conduit means connected to the discharge of said pump means and extending into said well casing to at least substantially the level of the subsurface formation into which fluid is to be injected, packer means sealing the annular space between the tubing string and the well casing at a point above the perforations in said casing, perforate stop means carried within said conduit means near the discharge point thereof, removable elongated filter means having a diameter less than the inner diameter of said conduit means whereby fluid passage means are formed between said filter means and said conduit means, said filter means adapted to pass freely through said conduit means and rest against said stop means, fishing head means carried on the top of said filter means, and sealing means carried by said filter means and positioned in the fluid passage means between said conduit means and the lower end of said filter means to prevent substantially the passage of fluid thereby, said filter means including conduit means in communication between the interior of said filter means and the discharge point of said injection conduit means downstream of said sealing means.

References Cited in the file of this patent
UNITED STATES PATENTS

| | | |
|---|---|---|
| 389,164 | Putney | Sept. 4, 1888 |
| 2,138,057 | Armentrout et al. | Nov. 29, 1938 |
| 2,152,779 | Wagner et al. | Apr. 4, 1939 |
| 2,163,933 | Brown | June 27, 1939 |
| 2,412,765 | Buddrus et al. | Dec. 17, 1946 |
| 2,670,801 | Sherborne | Mar. 2, 1954 |
| 2,799,641 | Bell | July 16, 1957 |